July 6, 1965 V. AZGAPETIAN 3,193,672

SOLID STATE COMPUTER

Filed March 28, 1960 4 Sheets-Sheet 1

INVENTOR.
VICTOR AZGAPETIAN
BY
ATTORNEY

INVENTOR.
VICTOR AZGAPETIAN
BY
ATTORNEY

INVENTOR.
VICTOR AZGAPETIAN
BY Carl Hoppe
ATTORNEY

July 6, 1965 V. AZGAPETIAN 3,193,672

SOLID STATE COMPUTER

Filed March 28, 1960 4 Sheets-Sheet 4

INVENTOR.
VICTOR AZGAPETIAN
BY Carl Hoppe
ATTORNEY 3,193,672

SOLID STATE COMPUTER

Victor Azgapetian, Santa Barbara, Calif., assignor to Servomechanisms, Inc., Hawthorne, Calif., a corporation of New York Filed Mar. 28, 1960, Ser. No. 18,028
8 Claims. (Cl. 235—194)

This invention relates generally to electronic computers and more particularly to solid state electronic analogue computers having electroluminescent-photoconductive components.

It is an object of this invention to provide a simple computer having no moving parts and resulting in increased reliability over present computers.

It is a further object of this invention to provide computer components of substantially reduced size and weight relative to equivalent components heretofore employed.

It is another object of this invention to provide improved computer components and circuits having extremely small power requirements.

It is still another object of this invention to provide a basic solid state servomechanism extendable by appropriate circuits to perform repeating functions as well as a variety of computing functions.

It is also an object of this invention to provide a computer having low maintenance requirements as a result of its inherent reliability characteristics.

The foregoing and other objects and advantages of this invention will become apparent to those skilled in the art upon an understanding of the following description considered in conjunction with the accompanying drawings and appended claims. This invention and the computing circuits with which it is associated are illustrated in a preferred embodiment in the accompanying drawings wherein FIG. 1 is a schematic diagram illustrating the basic servo loop of the present invention;

*General nature of invention*

The present invention utilizes the unique properties displayed by certain electroluminescent and photoconductive materials by combining elements comprised of these materials in a simple follower servo loop coupled with responsive computing circuits. Electroluminescent materials, such as cadmium sulfide, zinc sulfoselenide and zinc sulfide-copper alloys, exhibit the characteristic of emitting light when subjected to an alterating voltage field. The intensity of the emitted light varies directly as a function of the applied voltage gradient. Photoconductive materials, of which cadmium sulfide and cadmium selenide are typical and in wide use, exhibit the property of varying in electrical conductivity as a function of the amount of light incident upon them. This property is manifested by a change in resistance in an empirical relation to the intensity of the incident light. Although the foregoing materials and properties are well-known, these materials heretofore have not been applied to feedback servo loops and computer circuits described as the present invention.

Figures 1, 2:
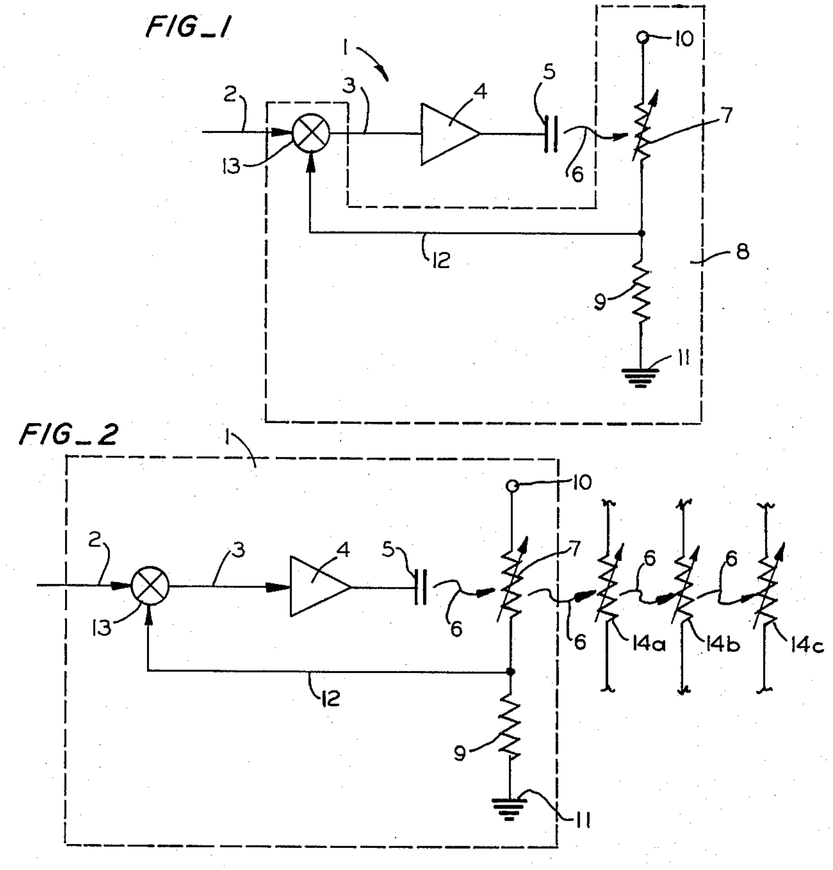
FIG. 2 is a schematic diagram illustrating the present invention arranged to perform a repeating function.

FIG. 1 illustrates the use of electroluminescent and photoconductive materials combined in the fundamental servo loop forming the basis of the present invention and referred to generally as 1. An alternating voltage input command signal 2 is provided to energize an element composed of electroluminescent material. The command signal represents and is a function of some quantity or data to be utilized in the computing circuits of the computer. The input voltage 2 is supplied directly through conduit 3 to a high-gain voltage amplifier 4 which furnishes the necessary potential to energize an electroluminescent element 5, referred to herein for simplicity as a lamp and more fully discussed later in this description. The voltage impressed across electroluminescent lamp 5 causes it to emit light represented by the wavy line 6 in FIG. 1. This light falls upon an element 7 positioned adjacent to lamp 5 and formed of photoconductive material, referred to herein as a photoconductive resistor and represented as a variable resistor in the various diagrams. This combination of electroluminescent lamp 5 and the corresponding photoconductive resistor 7 optically coupled uninterruptibly to it, is the fundamental concept of the present invention.

The photoconductive resistor 7 is part of a feedback control circuit 8 comprising voltage dividing means which includes the photoconductive resistor 7 and a fixed resistor 9 connected in series between a source of uniform excitation voltage 10 and ground as at 11. The voltage dividing means is center-tapped by a feedback voltage connection 12 which supplies a variable feedback voltage to summing means 13. Various types of summing means will be apparent to those skilled in this art for comparing the feedback voltage in connection 12 with the input command voltage 2 to produce an error signal which is the difference between the two voltages. The resultant error signal is also supplied to the amplifier 4 by conduit 3 and controls the performance of the servo loop 1 so that the intensity of the light emitted from electroluminescent lamp 5 is stabilized at a value exactly corresponding to the input command voltage 2.

For example, as an increase in the input command voltage 2 occurs the intensity of light emitted by electroluminescent lamp 5 increases. This increased illumination falling upon photoconductive resistor 7, reduces its resistance and hence the voltage drop across it. The related voltage drop across fixed resistor 9, the feedback voltage, is increased. This increase in feedback voltage results in returning the error signal to its null level and the loop is thereby stabilized at the value of the new input command voltage. It will be apparent that individual non-linearities existing in the components of the loop are of no consequence in the ultimate performance of the loop. In fact, even if the characteristics of the electroluminescent lamp or the photoconductive resistor should change, the servo action is unaffected. Moreover, a high amplifier gain is provided to minimize any static error in the system.

*Computing circuits*

Light emitted from this basic servo loop 1 in controlled relation to the input command signal 2 is utilized in various computing circuits, each of which includes a photoconductive element optically coupled uninterruptibly to the electroluminescent lamp 5 of the basic servo loop. By way of example, FIGS. 2 through 8 illustrate the combination of the basic servo loop of the present invention with various optically coupled computing circuits responsive to the light emitted from the driving loop. A basic servo loop of the type illustrated in FIG. 1 is provided for each particular input signal supplied to the computer and that loop with its own coupled light responsive circuits performs predetermined computing operations programmed for the particular signal. The light responsive element is oriented with respect to the emitted light so that the light cannot be interrupted by external influences. The light responsive element is also isolated from all extraneous light.

FIG. 2 illustrates a light responsive circuit combined with the basic servo loop 1 to make it useful as a repeater. It will be observed in FIG. 2 that to operate as a repeater, additional photoconductive resistors, 14*a*, 14*b* and 14*c*, are optically coupled to the electroluminescent lamp 5 of the basic servo which emits light as a function of the input signal to be repeated. In FIG. 2, three light responsive resistors receive the same incident light 6 which falls upon photoconductive resistor 7 in the feedback circuit of the basic servo loop. The change in resistance of the repeating photoconductive resistors 14*a*, 14*b* and 14*c* is proportional to the resistance change in the feedback resistor 7 resulting in a direct repetition of the input command signal 2. These resistors 14*a*, 14*b* and 14*c* are incorporated in circuits performing further computing functions. For purposes of simplicity these circuits are not illustrated in FIG. 2 other than the photoconductive resistor element therein. It will be observed that one or many of these photoconductive repeater resistors may be provided and the only limiting factor is the number of resistors which can be effectively and uniformly exposed to the light 6 emitted from a given servo loop 1.

Figure 3:
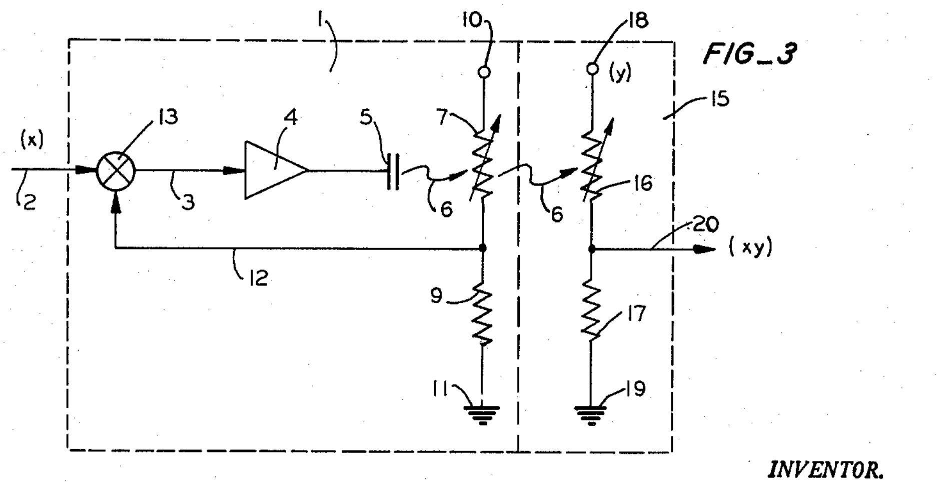
FIG. 3 is a schematic diagram illustrating the present invention performing a multiplication function.

FIG. 3 illustrates the basic solid state servo loop 1 in combination with an optically coupled responsive circuit 15 for performing a multiplication function. Multiplication is accomplished by using one variable $x$ as the input command signal 2 to the solid state servo loop 1 and the other variable $y$ as the voltage excitation of voltage dividing output circuit 15. This latter circuit comprises a photoconductive resistor 16 and a fixed resistor 17 in series across the excitation voltage $y$ applied at 18 and ground 19. The photoconductive resistor 16 is exposed to the same light 6 incident upon the photoconductive resistor 7 forming a part of the basic servo feedback circuit. This light 6 is a function of $x$ and varies the resistance of resistor 16 as a function of $x$. The center tap 20 of the voltage divider produces a voltage $xy$ proportional to the two variables which itself can be repeated in another solid state servo loop, if multiple outputs are desired.

Figure 4:
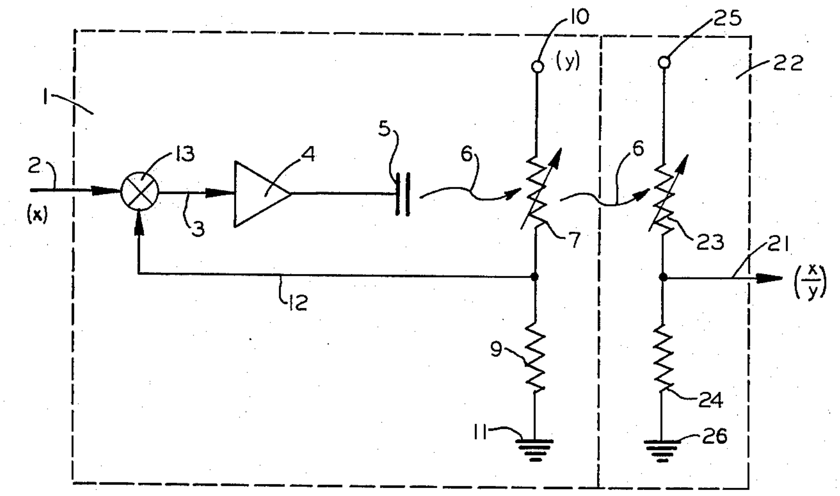
FIG. 4 is a schematic diagram illustrating the present invention performing a dividing function.

Division of two variables is also accomplished in a very direct manner with the servo loop of the present invention as illustrated in FIG. 4. Using well-known analogue techniques the feedback control circuit 8 of the servo loop 1 is excited at 10 by the second variable $y$. The first variable $x$ is the input command signal 2 to the servo loop. In this manner the null point for the error signal produced by summing means 13 is established so that the feedback voltage, in order to satisfy the loop equation, is equal to the desired quotient. Referring to FIG. 4 it will be observed that the feedback voltage in connection 12 is a function of the product of the effect of the light 6 emitted from electroluminescent lamp 5 and the feedback circuit excitation 10 which is variable $y$. Since at equilibrium of the servo loop 1 the feedback voltage must equal the input command voltage $x$, the effect of the light 6 times $y$ must equal $x$. Therefore, the effect of the light equals $x/y$, the desired quotient. This quotient is produced at the center tap 21 of an output voltage dividing circuit 22 having a photoconductive resistor 23 optically coupled to lamp 5 and responsive to the light emitted from it. The voltage dividing output circuit 22 comprises a photoconductive resistor 23 and a fixed resistor 24 in series across an excitation voltage source 25 and ground 26. Any number of outputs of $x/y$ can be made available by merely exposing additional similar output circuits to the emitted light 6 which is the function of $x/y$. Moreover, a third variable can be introduced as a multiplier by replacing the constant excitation 25 of the output circuit 22 by a voltage signal proportional to the third variable $z$.

Figure 5:
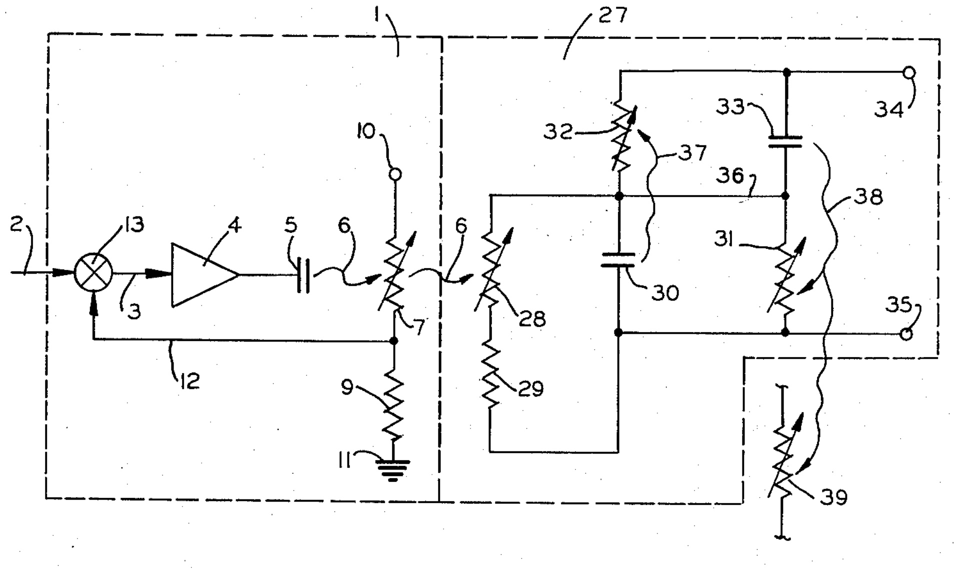
FIG. 5 is a schematic diagram illustrating the present invention performing a switching function.

The present invention untilized as a regenerative switching means is illustrated in FIG. 5. In performing the switching function a regenerative type output circuit is essential to overcome the inherent delay characteristics of the photoconductive resistance material. Referring to FIG. 5, the basic solid state servo 1 emits light 6 directly related to a switching command signal 2 which is the input to the servo. The switching network 27 optically coupled to the basic servo comprises a photoconductive resistor 28 which receives the light 6 emitted from the controlling servo loop and a resistor 29 is connected in series and both as a unit connected in parallel with electroluminescent lamp 30 and a second photoconductive resistor 31. The electroluminescent lamp 30 is connected in series with and optically coupled to a third photoconductive resistor 32. Photoconductive resistor 31 is connected in series with and optically coupled to a second electroluminescent lamp 33. The lamp 30 and resistor 32, as a unit, and the resistor 31 and the lamp 33, as a unit, are connected in parallel across a source of excitation voltage applied to terminals 34 and 35. The switching network 27 is completed by a bridging connection 36 interconnecting the foregoing electroluminescent-photoconductive units, 30, 32 and 31, 33, respectively.

The threshold for switching is reached at any particular predetermined intensity of light 6 from servo loop 1 by adjustment of the end resistor 29 and the switch excitation applied at 34, 35. As this value is reached (assume from the "off" condition) the resistance of resistor 28 decreases to the point where the voltage across lamp 30 is reduced below the critical threshold value. Light 37 emitted from lamp 30 is reduced and this increases the resistance of resistor 32 and regenerative action takes place. The voltage drop across both resistor 32 and electroluminescent lamp 33 increases. When this occurs the resistance of photoconductive resistor 31 receiving light 38 emitted from lamp 33 is decreased, again tending to reduce the voltage drop across electroluminescent lamp 30. This forces the same set of events throughout the circuit and produces a regenerative action. The result is that lamp 33 turns from "off" to "on" very rapidly. Additional photoconductive elements such as resistor 39 are provided in optical association with lamp 33 for use in one or more external circuits requiring switching control.

To turn the switch "off" either one of two expedients is used. Either the increase in resistance of resistor 28 due to reduced light emission from the servo loop 1 is used to reverse the regenerative switching cycle, or another photoconductive element is applied in parallel with photoconductive resistor 32 to "short" selectively the voltage drop across it. With either expedient lamp 30 is relighted and the switch turned "off."

The same basic servo loop and an optically coupled photoconductive output circuit are applicable to the generation of an arbitrary function which is dependent upon a single variable. As previously stated in this description light is produced from electroluminescent materials by applying a voltage gradient across the material. Consequently, if the thickness of a sheet of electroluminescent material is varied according to a desired functional relationship, then the light output for a given applied voltage will vary across the sheet of material according to its thickness in the desired functional relationship. This non-uniformity can be used directly to control responsive photoconductive resistance circuits as outlined hereinabove so that the output of such circuits will be an arbitrary function of the input to the basic servo, instead of a linear function.

Figure 6:
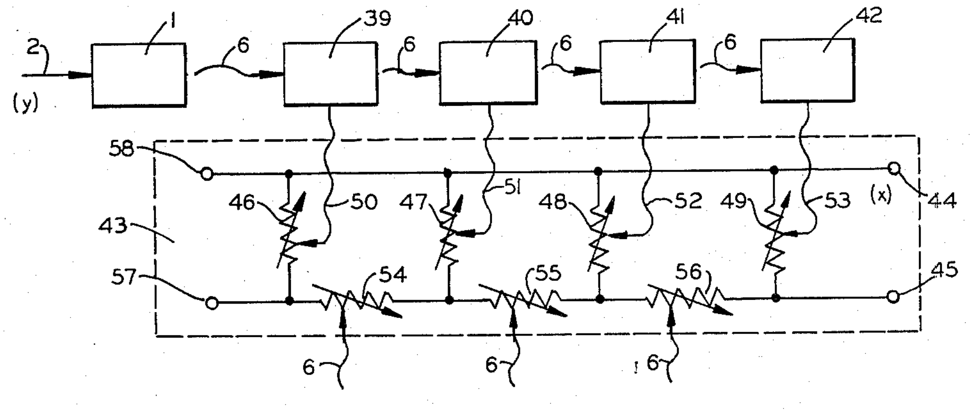
FIG. 6 is a schematic diagram illustrating the present invention utilized to generate a function.

A more flexible method of function generation is illustrated in FIG. 6 where the desired function is approximated by a large number of straight line segments. Here a series of regenerative switches 39, 40, 41 and 42 of the type described in connection with FIG. 5 are set to operate at various threshold levels and are used to switch resistance values into a network 43, thereby varying its output appearing at terminals 44, 45 to give the desired function. One variable $y$ is the input command signal to a solid state servo loop 1. Light 6 emitted from this servo is optically associated with switches 39, 40, 41 and 42, each of which in turn has one of its electroluminescent lamps (for example, electroluminescent lamp 33 of FIG. 5) optically coupled to one of a plurality of photoconductive resistors 46, 47, 48 and 49 connected in parallel in network 43. Light 50 emitted from switch 39 varies the conductivity of resistor 46; light 51 from switch 40 varies the conductivity of resistor 47; light 52 from switch 41 varies the conductivity of resistor 48; and light 53 from switch 42 varies the conductivity of resistor 49. Intermediate resistors 46 and 47 and in series therewith, is connected a photoconductive resistor 54 optically associated with light 6 emitted from solid state servo 1. Similarly resistor 55 is connected in series with and intermediate resistors 47 and 48, and resistor 56 is placed in series with and intermediate resistors 48 and 49. These resistors are similarly optically associated with light 6 emitted from controlling servo 1. Excitation voltage is provided to the network at terminals 57 and 58 across the parallel resistors 46, 47, 48 and 49.

The output $x$ of the network 43 appearing at terminals 44, 45 is varied by the input command $y$ as a function of the light 6 emitted from the servo 1 which selectively actuates one or more of the switches 39, 40, 41 and 42 and the corresponding one of resistors 54, 55 or 56 to connect or disconnect resistors in the network and produce the desired output $x$.

The fundamental servo loop 1 with coupled light responsive output circuits is also useful for generating a signal which is proportional to the rate of change of an input variable as is more fully described in copending United States application Serial No. 16,592, filed March 21, 1960, now U.S. Patent No. 3,039,692, assigned to a common assignee.

Figure 7:
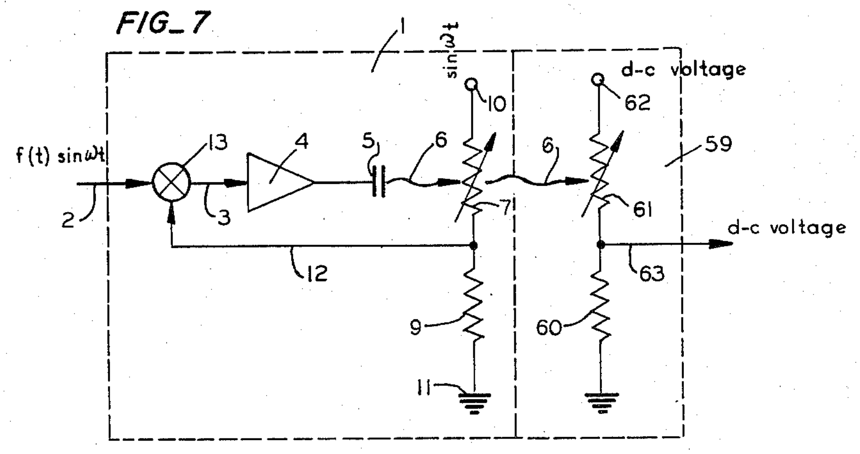
FIG. 7 is a schematic diagram illustrating the present invention performing a demodulation function.

Demodulation of an input signal is also easily accomplished with components utilizing features of the present invention as appears in FIG. 7. For demodulation the modulated signal $[f(t)\ \sin\ \omega t]$ is applied as the input 2 to a solid state servo 1 having a multiplication output circuit 59 similar to that of FIG. 3. Voltage dividing means including a fixed resistor 60 and a photoconductive resistor 61 is optically associated with light 6 emitted from the servo 1. The A.-C. carrier signal $[\sin\ \omega t]$ of the input command 2 is applied as excitation voltage for the feedback control circuit of the servo loop as at 10 and a D.-C. voltage is applied as the excitation for the output circuit at 62. The output appearing at the center tap 63 is a D.-C. voltage proportional to the demodulated input $[f(t)]$. As discussed in connection with the division servo circuit of FIG. 4 the effect of the light 6 from the electroluminescent lamp 5 which is a part of the solid state servo equals $f(t)$. The A.-C. carrier signals $[\sin\ \omega t]$ cancel out at equilibrium resulting in effective demodulation.

The foregoing computing circuits are described for illustrative purposes only and not by way of limitation. Additional useful circuits will become apparent to those skilled in this art.

*Electroluminescent-photoconductive structure*

Figure 8:
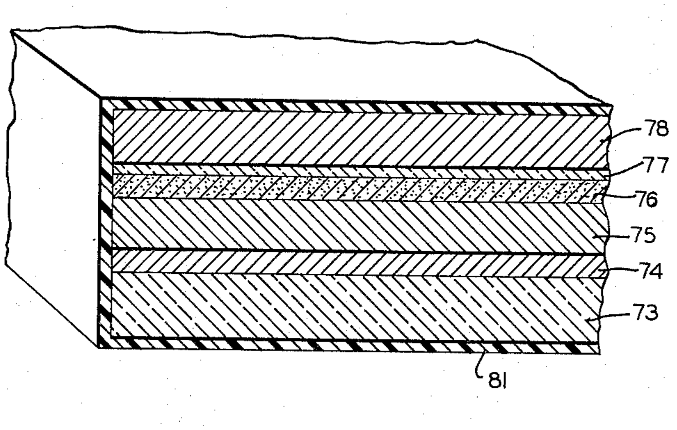
FIG. 8 is a cross sectional view of one embodiment of an electroluminescent-photoconductive structure which is the basis of the present invention.
Figure 9:
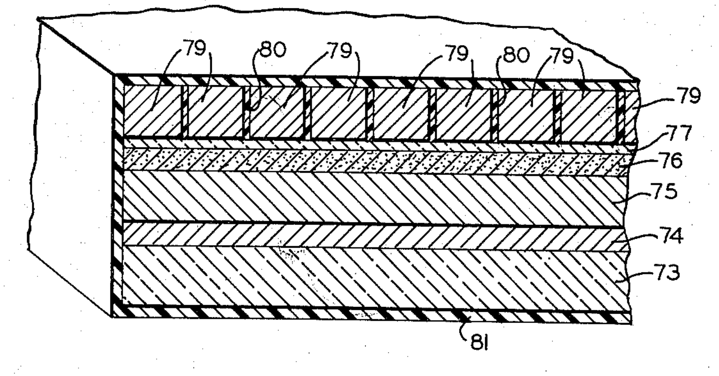
FIG. 9 is a cross sectional view of a modified form of the electroluminescent-photoconductive structure of FIG. 8.

The principal objects of high reliability and small size are accomplished in one embodiment of the present invention by including in a single sandwich structure impervious to extraneous light, the electroluminescent material and the optically associated photoconductive resistor element of the basic servo loop together with those resistor elements included in the circuits actuated by the loop. Specific forms of this sandwich structure are illustrated in FIGS. 8 and 9 wherein a rigid base or substrata material 73 such as glass is provided, upon one side of which is applied an opaque conductive coating 74. Over this electroluminescent layer 75 is applied in the form of a thin film of electroluminescent phosphor-bearing material. This film is followed by a second conductive coating 76, which is transparent in order to allow light to pass through it. An example of such a coating is stannic oxide. A thin transparent electric insulating layer 77 is next deposited to isolate electrically the electroluminescent material and its embracing conductors 74, 76. Glass with good heat resisting capabilities has been found to be satisfactory for this layer. On top of transparent insulating layer 77, a layer of photoconductive material 78 is applied. The photoconductive material for a modular unit comprising only the servo loop 1 of FIG. 1 is provided in a unitary layer as indicated in FIG. 8. A unit containing a basic servo loop 1 together with photoconductive elements for a plurality of output circuits is illustrated in FIG. 9 where the photoconductive material is formed into slugs 79 separated by insulating material 80. In this manner the light emitted from the layer 75 cannot be interrupted by external influences.

The sandwich assembly is then enclosed in a covering 81 impervious to light to isolate completely the unit from extraneous light. Such materials are well-known to those skilled in this art. The necessary lead-in wires to the photoconductive material 78, 79 and to conductive coatings 74 and 76 of the electroluminescent layer 75 are brought out along one face of the modular package. Various modifications of the wiring arrangement for specific applications will be apparent to those skilled in this art.

An electrolminescent-photoconductive servo having five output resistors for use in output circuits measures approximately .15 x .25 x 1.0 inches. The approximate thicknesses of the various layers of the structure are as follows.

| Layer: | Thickness |
|---|---|
| Covering material | .030 |
| Base | .040 |
| Conductive coating | .002 |
| Electroluminescent material | .002 |
| Transparent conductive coating | .002 |
| Transparent insulating layer | .004 |
| Photoconductive material | .040 |
| Covering material | .030 |
| Total | .150 |

It will be apparent to those skilled in this art, however, that the number of output or computing elements of the foregoing packaged unit is practically unlimited for any number of photoconductive computing resistors 79 can be positioned on and controlled by a single sheet of electroluminescent material.

A servo package fabricated according to the structure illustrated in FIG. 9 accomplishes a remarkable weight and volume saving over equivalent components presently used to perform a corresponding function. A weight reduction of more than 70 to 1 and a corresponding volume reduction of over 90 to 1 is possible relative to equivalent components heretofore in use.

A further important advantage of the present invention is the low power consumption of each servo loop enabling a transistor amplifier to be applied to satisfy the requirements for voltage amplification. Such an amplifier can be made very tiny with circuit techniques familiar to those skilled in this art. The principal power requirement for an electroluminescent-photoconductive package of the type described herein is for energizing the electroluminescent lamp. This demand is large compared to the power required in the associated computing circuits, and is in the order of .015 watt. With this small requirement for power a variety of amplifiers 4 may be used, such as a time-shared high voltage-gain transistor servo amplifier in conjunction with a transformer or a high turns-ratio midget transformer drawing power directly from the previous stage of the computer or from the transducer supplying basic information.

The foregoing detailed description has been given for clearness of understanding only and no unnecessary limitations should be understood therefrom, for modifications of the structure and circuits of the present invention will be obvious to those skilled in the art.

I claim:

1. In an electronic computer, a solid state closed servo loop including a voltage amplifier; means for supplying a command voltage to said amplifier; electroluminescent means energized by the output of said amplifier and emitting light varying in intensity in relation to said command voltage; and feedback control means supplying an error signal to said amplifier including voltage dividing means having a photoconductive element optically coupled uninterruptibly to said electroluminescent means and responsive to the intensity of said light, means for isolating said photoconductive element from extraneous light, a source of excitation voltage applied across said voltage dividing means for developing a feedback voltage varying in relation to the conductivity of said photoconductive element, and summing means for comparing said feedback voltage with said command voltage and for producing said error signal.

2. In an electronic computer, a solid state closed servo loop according to claim 1 emitting light varying in intensity in relation to a command signal and at least one computing circuit optically associated uninterruptibly with said light and responsive to the intensity of only said light.

3. Electronic computer repeating means including a solid state servo loop according to claim 1 emitting light varying in intensity in relation to a command signal and a plurality of output circuits each including a separate photoconductive element optically associated uninterruptibly with said light and responsive to the intensity of only said light.

4. Electronic computer multiplying means including a solid state closed servo loop according to claim 1 emitting light varying in intensity in relation to a command voltage proportional to a first variable and at least one multiplying output circuit including voltage dividing means having a photoconductive element optically coupled uninterruptibly to said servo loop and responsive to the intensity of only said light, a source of excitation voltage proportional to a second variable applied across said voltage dividing means, and a center tap output connection on said voltage dividing means producing an output voltage proportional to the product of said first and said second variables.

5. Electronic computer dividing means including a solid state servo loop according to claim 1 wherein said command voltage is proportional to a first variable and said excitation voltage of said feedback control means is proportional to a second variable thereby causing said electroluminescent material to emit light varying in intensity in relation to the quotient of said variables and at least one output circuit having a photoconductive element optically coupled uninterruptibly to said servo loop and responsive to the intensity of only said light.

6. Electronic computer switching means including a solid state servo loop according to claim 1 emitting light varying in intensity in relation to a command signal; at least one switching circuit including a source of excitation voltage, a first electroluminescent element, a first photoconductive element connected in series with said first electroluminescent element and optically coupled uninterruptibly therewith, said first electroluminescent element and said first photoconductive element being connected across said source of excitation voltage, a second electroluminescent element, a second photoconductive element connected in series with said second electroluminescent element and optically coupled uninterruptibly therewith, said second electroluminescent element and said second photoconductive element being connected across said source of excitation voltage, and a third photoconductive element optically associated uninterruptibly with and responsive to only light emitted from said servo loop and connected in parallel with said first electroluminescent element and with said second photoconductive element; and at least one output circuit including a fourth photoconductive element optically associated uninterruptibly with said second electroluminescent element and responsive to the intensity of only its light.

7. In an electronic computer means for generating an arbitrary function of a single variable including a solid state servo loop according to claim 1 emitting light varying in intensity in direct relation to said single variable; a plurality of switching means optically coupled uninterruptibly to said servo loop, each being selectively responsive to a specific value of intensity of said light and said specific values being related to said arbitrary function of said single variable; a source of excitation voltage; and an output network, including a plurality of photoconductive elements connected in series, each being responsive only to said light at a corresponding one of said specific values, and a plurality of photoconductive elements connected in parallel across said source of excitation voltage, each being optically associated uninterruptibly with and responsive to one of said switching means.

8. In an electronic computer means for demodulating a command voltage including a solid state servo loop according to claim 1 wherein said excitation voltage of said feedback control means is proportional to the carrier of said command voltage thereby causing said electroluminescent material to emit light varying in intensity in relation to the demodulated command voltage; and at least one output circuit including a photoconductive element optically coupled uninterruptibly to said servo loop and responsive to the intensity of said light, and a source of D.-C. excitation voltage applied to said photoconductive element.

References Cited by the Examiner

UNITED STATES PATENTS

| | | | |
|---|---|---|---|
| 2,672,529 | 3/54 | Villard | 330—85 |
| 2,841,329 | 7/58 | Statsinger | 235—194 XR |
| 2,886,659 | 5/59 | Schroeder | 330—85 |
| 2,894,145 | 7/59 | Lehovec | 235—194 XR |
| 2,905,384 | 9/59 | Green | 235—194 |
| 2,926,263 | 2/60 | Kazan | 250—213 |
| 2,942,120 | 6/60 | Kazan | 250—213 |
| 2,959,958 | 11/60 | Savet | 235—194 XR |
| 3,039,692 | 6/62 | Lohneiss et al. | 235—183 |
| 3,040,178 | 6/62 | Lyman et al. | 250—213 |
| 3,070,306 | 12/62 | Du Bois | 235—194 XR |

OTHER REFERENCES

Spitzer, Lumistors: Applications and Limitations (paper presented on Oct. 13, 1958, at Chicago, to National Electronics Conference), Proceedings of the National Electronics Conference, 1958, vol. 14 (copy in Library, TK, 7801, N3, (2) published March 27, 1959; received by Patent Office May 16, 1960) (page 360 relied on).

MALCOLM A. MORRISON, *Primary Examiner.*

CORNELIUS D. ANGEL, DARYL W. COOK, *Examiners.*